United States Patent
Kitaura et al.

(10) Patent No.: US 8,448,931 B2
(45) Date of Patent: May 28, 2013

(54) WORK PALLET POSITIONING AND FIXING DEVICE

(75) Inventors: Ichiro Kitaura, Hyogo (JP); Takayuki Munechika, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 0 days.

(21) Appl. No.: 13/513,649

(22) PCT Filed: Feb. 8, 2011

(86) PCT No.: PCT/JP2011/052618
§ 371 (c)(1),
(2), (4) Date: Jun. 4, 2012

(87) PCT Pub. No.: WO2011/105208
PCT Pub. Date: Sep. 1, 2011

(65) Prior Publication Data
US 2012/0321410 A1    Dec. 20, 2012

(30) Foreign Application Priority Data

Feb. 23, 2010 (JP) ................. 2010-037155
Apr. 2, 2010 (JP) ................. 2010-085932

(51) Int. Cl.
*B23Q 3/00* (2006.01)
(52) U.S. Cl.
USPC .......................... 269/309; 269/900
(58) Field of Classification Search
USPC ......................... 269/309, 310, 900
See application file for complete search history.

(56) References Cited

U.S. PATENT DOCUMENTS

| 4,445,675 | A * | 5/1984 | Kitaura ........................ 269/20 |
| 6,955,347 | B2 * | 10/2005 | Kawakami et al. ........... 269/309 |
| 7,021,615 | B2 * | 4/2006 | Kuroda ......................... 269/309 |
| 7,819,392 | B2 * | 10/2010 | Kuroda et al. ............... 269/309 |
| 8,087,651 | B2 * | 1/2012 | Dahlquist .................... 269/309 |
| 2008/0061486 | A1 * | 3/2008 | Kuroda et al. .............. 269/48.1 |
| 2010/0308524 | A1 * | 12/2010 | Kitaura et al. ............... 269/309 |
| 2013/0043634 | A1 * | 2/2013 | Kitaura et al. ............... 269/309 |

FOREIGN PATENT DOCUMENTS

| JP | 2001-038564 | 2/2001 |
| JP | 2003-039264 | 2/2003 |
| JP | 2005-096012 | 4/2005 |
| JP | 2010085932 A * | 4/2010 |

OTHER PUBLICATIONS

Microfilm of the specification and drawings annexed to the request of Japanese Utility Model Application No. 144717/1989 (Laid-open No. 83102/1991) (The Yokohama Rubber Co., Ltd.), Aug. 23, 1991, p. 11, lines 5 to 16; fig. 4, 9 to 10 (Family: none).

* cited by examiner

Primary Examiner — Lee D Wilson
Assistant Examiner — Jamal Daniel
(74) Attorney, Agent, or Firm — Jordan and Hamburg LLP

(57) ABSTRACT

In a work pallet positioning and fixing device that positions a work pallet over a base member in the horizontal direction and in the vertical direction and fixes it thereto by pressing forces of clamp bolts, the base member is provided with first and second reference members for positioning, and a reference seating surface and, by making bolt head accommodation holes of bolt holes for four fitting bolts fitting flange portions of the reference members partially overlap with protruding engagement portions as seen in plan view, a plurality of tapered engagement surfaces on the external peripheries of the protruding engagement portions being segmented into four sections.

6 Claims, 7 Drawing Sheets

WORK PALLET POSITIONING AND FIXING DEVICE

BACKGROUND OF THE INVENTION

The present invention relates to a work pallet positioning and fixing device that positions and fixes a work pallet above a base member in the horizontal direction and in the vertical direction, and in particular relates to such a device that fixes the work pallet by manually driving a plurality of clamp bolts.

Conventionally, in the technical field of peripheral devices for machine tools, various types of work pallets for fixing workpieces to be supplied to machining, and work pallet positioning and fixing devices that position and fix such work pallets to base members, have been widely put into practical use.

For example, with the work pallet positioning and fixing device described in Patent Document #1, four set of ball lock type clamp mechanisms are provided on the base member side, while four ring members corresponding to the four clamp mechanisms are provided to the work pallet, so that the work pallet is positioned in the horizontal direction and in the vertical direction, and is clamped.

The clamp mechanism is constituted so as to be driven to clamp condition by laminated plate springs, and to be driven to clamp release condition by the hydraulic force of a hydraulic cylinder. With this positioning and fixing device, the work pallet is positioned in the horizontal direction and in the vertical direction by one set of a clamp mechanism and a positioning mechanism on a reference side, and is restricted so as not to rotate around the axis of the reference side clamp mechanism by another set of a clamp mechanism that is located in a diagonal relationship with the clamp mechanism and positioning mechanism on the reference side.

On the other hand, with the work pallet positioning and fixing device described in Patent Document #2, four set of ball lock type clamp mechanisms are provided on the base member side, while four ring members corresponding to the four clamp mechanisms are provided to the work pallet, so that the work pallet is positioned in the horizontal direction and in the vertical direction, and is clamped. The clamp mechanism is constituted so as to be driven to clamp condition by laminated plate springs, and to be driven to clamp release condition by the hydraulic force of a hydraulic cylinder.

In each of the clamp mechanisms, tubular axis portion having annular tapered surface on the outer circumferential surface is provided to the base member. An annular engagement portions that can be elastically deformed in the direction to increase its external diameter is formed on a ring member fixed to work pallet, and it is arranged to position the work pallet in the horizontal direction by mounting the work pallet onto the base member from above, fitting the annular engagement portions of the ring members over the tubular axis portions respectively, and engaging the annular engagement portions by the clamping force generated by the clamp mechanisms to the annular tapered surfaces of the tubular axis portions in the closely engaged state by means of elastically deforming the annular engagement portions in the direction to increase their external diameters.

Patent Document #1: Japanese Laid Open Patent Publication 2001-38564
Patent Document #2: Japanese Laid Open Patent Publication 2003-39264

With the devices of Patent Documents #1 and #2, hydraulic cylinders that are equipped with laminated plate springs are applied as the actuators for the clamp mechanisms. However the manufacturing cost becomes extremely high, since the hydraulic cylinders are large in size and also their structure is complicated. On the other hand, if a construction is adopted in which the work pallet is fixed to the base member by the clamping force of clamp bolts that are screwed by manual operation, then it becomes possible to make the clamp mechanism more compact, and to reduce the manufacturing cost.

Now, if a positioning mechanism is employed, as with the work pallet positioning and fixing device of Patent Document #2, in which annular engagement portions are deformed by the clamping force in the direction to increase their external diameters, and are thereby engaged to tapered engagement surfaces, then, since the clamping force of clamp bolts is comparatively weak as compared to the clamping force of hydraulic cylinders that are internally equipped with laminated plate springs or of hydraulic cylinders of a normal type, accordingly the function of elastically deforming the annular engagement portions will be reduced, and there is a possibility that the accuracy of positioning in the horizontal direction will be reduced.

Thus, while it may be considered to set the rigidity of the annular engagement portions in the horizontal direction lower, if this is done, it becomes difficult to ensure the positioning accuracy in the horizontal direction. For this reason, it is a technically difficult problem to provide a structure in which it is possible to deform the annular engagement portions elastically by the clamping force of clamp bolts that are driven manually to be tightened up, while still ensuring their rigidity.

If a construction is employed for the clamping and positioning mechanism in which a reference member is provided to the base member, and a flange portion formed on this reference member is fixed to the base member by a plurality of clamp bolts, then, if the diameter of the flange portion is increased, the reference member is increased in size, and its manufacturing cost becomes high.

SUMMARY OF THE INVENTION

The objective of the present invention is to provide a work pallet positioning and fixing device that can elastically deform the annular engagement portions with the clamping force of clamp bolts, while ensuring rigidity of the annular engagement portions on the work pallet side.

The present invention relates to a work pallet positioning and fixing device that positions and fixes a work pallet above a base member in the horizontal direction and in the vertical direction; wherein the base member comprises a first reference member for positioning in the horizontal direction, a second reference member disposed at a position distant from the first reference member and for restricting rotation in a horizontal plane around the first reference member as a center, and a reference seating surface for positioning in the vertical direction; each of the first and second reference members comprises a flange portion, a protruding engagement portion that projects upwards from a central portion of the flange portion, and a plurality of vertical fitting bolts and a plurality of fitting bolt holes that fix the flange portion to the base member; a bolt head accommodation hole of each of the fitting bolt holes being formed in a state of partially overlapping with the protruding engagement portion as seen in plan view, and a plurality of tapered engagement surfaces that reduce in diameter upwards are formed on an outer periphery of the protruding engagement portion between the bolt head accommodation holes; the work pallet comprises a plurality of annular engagement members, comprising respectively annular engagement portions capable of being deformed elastically in the direction to increase their external diameter, and capable of engaging with the plurality of tapered engagement surfaces of the first and the second reference members in a closely engaged state; and there is provided with a constitution that by mounting the work pallet on the reference seating surface of the base member, and by screwing a plurality of clamp bolts passed through a plurality of bolt passing holes formed in the work pallet into a plurality of bolt holes on the side of the base member and thereby pressing the work pallet to the reference seating surface, the work pallet is positioned and fixed via elastic deformation of the annular engagement portions.

According to the present invention 1, each of the first and second reference members has the flange portion and the protruding engagement portion, and, since the plurality of tapered engagement surfaces are formed that divide the external periphery of the protruding engagement portion into sections, and the plurality of vertical fitting bolts and the plurality of fitting bolt holes are provided that fix the flange portion to the base member, accordingly the bolt head portion accommodation holes of the fitting bolt holes are formed in a state of partially overlapping the protruding engagement portion as seen in plan view. And annular engagement members corresponding to the first and second reference members are provided to the work pallet, annular engagement portions capable of being deformed elastically in the direction to increase their external diameters are provided to these annular engagement members, and, by mounting the work pallet on the reference seating surface of the base member, and by fitting each of the annular engagement portions over the plurality of tapered engagement surfaces, the annular engagement portions are elastically deformed by the clamping force of the clamp bolts, so that they are engaged to the plurality of tapered engagement surfaces in the closely engaged state.

Accordingly, since the plurality of tapered engagement surfaces are divided into sections by the bolt head accommodation holes and thus are defined to be short in the circumferential direction, and since the contacting pressure between the plurality of tapered engagement surfaces and the annular engagement portions becomes high due to the clamping force of the clamp bolts, accordingly it becomes easy for the annular engagement portions to be elastically deformed in the directions to increase their external diameters, so that the close contact of the plurality of tapered engagement surfaces and the annular engagement portions is enhanced, and thus the accuracy of positioning in the horizontal direction is enhanced.

Moreover since, in the first and second reference members, the plurality of fitting bolt holes formed in the flange portions are disposed as close as possible towards their centers (i.e. towards the protruding engagement portions), accordingly it is possible to make the diameter of flange portions smaller, and to make the flange portions more compact, it is possible to make the first and second reference members more compact, and also to reduce the manufacturing cost.

(1) In addition to the present invention described above, it would also be acceptable to adopt various constitutions as detailed below.

The plurality of clamp bolt holes are formed in central portions of the first and second reference members; the plurality of bolt passing holes are formed in portions of the work pallet that correspond to the clamp bolt holes; and in a state where the work pallet is mounted on the reference seating surface of the base member, the plurality of clamp bolts are passed through the bolt passing holes and are screwed into the clamp bolt holes of the first and second reference members.

According to this constitution, the plurality of bolt holes are formed in central portions of the first and second reference members, the plurality of bolt passing holes are formed in portions of the work pallet that correspond to the bolt holes, and the work pallet is mounted on the reference seating surface of the base member, and the plurality of clamp bolts passed through the bolt passing holes are screwed into the bolt holes of the first and second reference members. Thus, since the clamp bolts can be directly screwed into the first and second reference members when the first and second reference members are engaged with the annular engagement members, accordingly it is possible to engage the plurality of tapered engagement surfaces with the annular engagement portions in the closely engaged state.

(2) A pair of first vertical bolt passing holes are formed in central portions of the first and second reference members respectively;

the plurality of bolt holes are formed in portions of the base member that correspond to the first bolt passing holes;

the plurality of bolt passing holes are formed in portions of the work pallet that correspond to the first bolt passing holes; and the work pallet is mounted on the reference seating surface of the base member, and the plurality of clamp bolts are passed respectively through the bolt passing holes and the first bolt passing holes of the first and second reference members, and are screwed into the bolt holes of the base member respectively.

According to this constitution, the first vertical bolt passing holes are formed in central portions of the first and second reference members, the plurality of bolt holes are formed in portions of the base member that correspond to the first bolt passing holes, the plurality of bolt passing holes are formed in portions of the work pallet that correspond to the first bolt passing holes, and the work pallet is mounted on the reference seating surface of the base member, and the plurality of clamp bolts are passed through the first bolt passing holes and the bolt passing holes of the first and second reference members and are screwed into the bolt holes of the base member. Thus, since the work pallet is positioned and fixed above the base member by the clamp bolts passing through the first and second reference members and being directly screwed with the base member, it becomes possible to fix the first and second reference members to the base member with the minimum level of fixing force, so that it is possible to reduce the number of the plurality of fitting bolts, or to reduce the sizes of the fitting bolts, whereby it is possible to reduce the diameters of the flange portions, and to reduce the manufacturing cost.

(3) The second reference member has a pair of tapered engagement surfaces that, as seen in plan view, oppose one another in a direction orthogonal to a center line that joins axes of the first and second reference members.

According to this constitution, it is possible reliably to restrict rotation of the work pallet around the axis of the first reference member.

(4) On an upper surface of the base member, the reference seating surface is formed on which a lower surface of the work pallet is seated. According to this constitution, the reference seating surface on which the lower surface of the work pallet is seated is defined on the upper surface of the base member, accordingly, it is possible to take advantage of the base member for forming the reference seating surface, also it is possible to establish a state in which there is no gap between the base member and the work pallet, so that it is possible to enable prevention of the ingress of cutting chips.

(5) Each of flange portions of the first and second reference members is received in a concave hole formed in the base member and is fixed by a plurality of fitting bolts, and each of the annular engagement members is pressed into and fixed in concave fitting hole that is opening to a lower surface of the work pallet. According to this constitution, the flange portions of the first and second reference members are contained and fixed in the concave holes formed in the base member, while the annular engagement members are pressed into and fixed in the concave fitting holes formed in the work pallet, accordingly it is possible to make the upper surface of the base member as flat, and it is possible to make the lower surface of the work pallet as flat.

BEST MODE FOR IMPLEMENTING THE INVENTION

In the following, the best mode for implementing the present invention will be explained on the basis of various embodiments.

Embodiment 1

Figure 1:
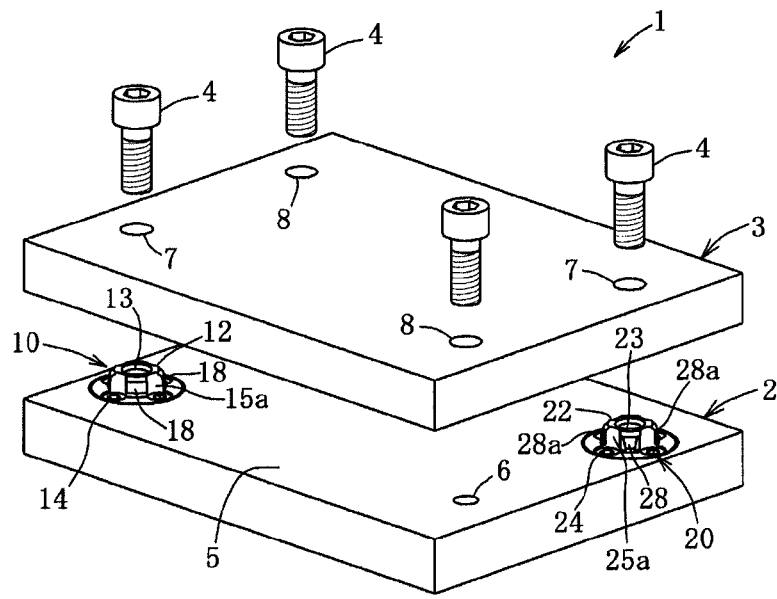
FIG. 1 is an exploded perspective view of a work pallet positioning and fixing device according to a first embodiment.
Figure 2:
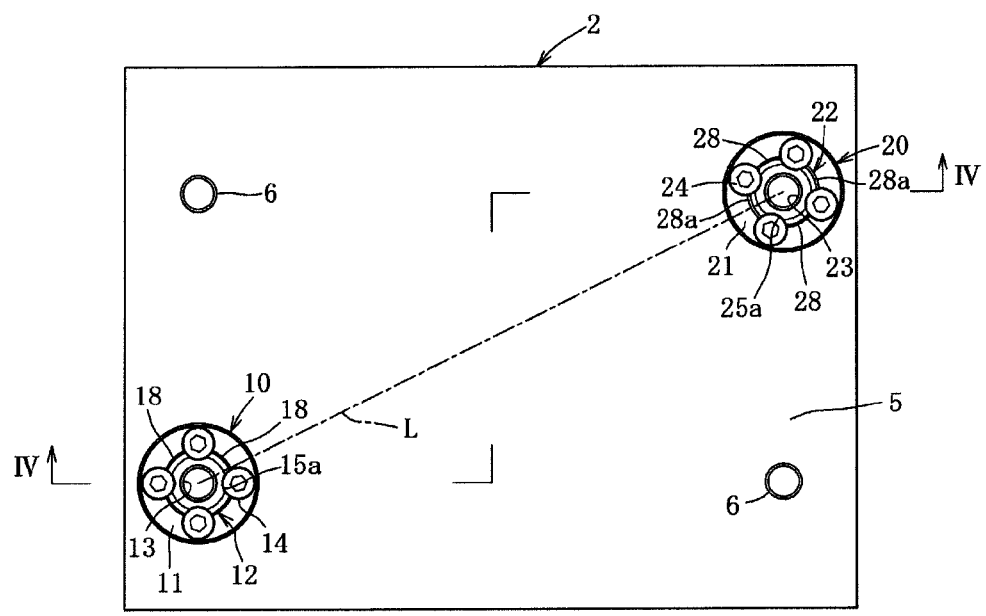
FIG. 2 is a plan view of a base member.

As shown in FIG. 1, the work pallet positioning and fixing device 1 of the first embodiment (hereinafter termed a "positioning and fixing device") is a device that positions a work pallet 3 above a base member 2 in the horizontal direction and in the vertical direction, and that fixes it there with a plurality of clamp bolts 4.

The base member 2 is placed on a table of a machine tool or the like in the state of being fixed thereto. One or a plurality of workpieces (not shown) are fixed on the work pallet 3 by a clamp device (not shown) or by bolts, this work pallet 3 is conveyed onto the base member 2, and, after having positioned and fixed the work pallet 3 in the horizontal direction and in the vertical direction, machining is performed on the one or a plurality of workpieces on the work pallet 3.

This positioning and fixing device 1 comprises the base member 2, the work pallet 3, and four clamp bolts 4. The base member 2 and the work pallet 3 are both made as thick flat rectangular plate members with steel menterial. The entire area of the upper surface of the base member 2 defines a horizontal reference seating surface 5 for seating the lower surface of the work pallet 3 and for positioning it in the vertical direction.

As shown in FIGS. 1, 2, and 4 through 6, the base member 2 comprises a first reference member 10 for positioning in the horizontal direction, a second reference member 20 that is positioned at a position distant from the first reference member 10 and that serves for restricting rotation within the horizontal plane around the first reference member 10 as a center, the reference seating surface 5, and a pair of bolt holes 6. The first and second reference members 10, 20 are located at areas near a pair of corner portions of the base member 2 that are in a mutually diagonal relationship. And the pair of bolt holes 6 is located at areas near a pair of corner portions of the base member 2 that are in a mutually diagonal relationship (i.e. the pair of corner portions other than the abovementioned pair of corner portions).

The first reference member 10 comprises a flange portion 11 that is formed as a circular plate, a protruding engagement portion 12 that projects upwards from the central portion of the flange portion 11, a vertical bolt hole 13 formed in the central portion of the first reference member 10, and four vertical fitting bolts 14 for fixing the flange portion 11 to the base member 2 and four fitting bolt holes 15. The four fitting bolt holes 15 are arranged at equidistant positions around the circumferential direction.

The flange portion 11 is fixed, in the state in which the flange portion 11 of the first reference member 10 is received in a concave hole 16 formed in the base member 2, by passing each of the four fitting bolts 14 into a corresponding fitting bolt hole 15 and by screwing them into fitting bolt holes 17 formed in the base member 2. The upper surface of the flange portion 11 is formed as a horizontal plane that is lower than the reference seating surface 5 by a minute distance (refer to FIG. 4). As seen in plan view, a bolt head accommodation hole 15a of each of the fitting bolt holes 15 is formed so as partially to overlap with the protruding engagement portion 12. In other words, the bolt head accommodation hole 15a of each of the fitting bolt holes 15 is formed so as partially to encroach into the external circumferential portion of the protruding engagement portion 12. And each of the bolt heads of the fitting bolts 14 is contained in the lower half portion of the bolt head accommodation hole 15a. The bolt head accommodation hole 15a encroaches by approximately ⅓ of its diameter into the external peripheral portion of the protruding engagement portion 12. The thickness of the wall portion between the bolt head accommodation hole 15a and the outer circumferential surface of the flange portion 11 is extremely small. Due to this, it is possible to reduce the diameter of the flange portion 11 as much as possible and to make the first reference member 10 more compact, so that it is possible to reduce the manufacturing cost.

Four tapered engagement surfaces 18 that reduce in diameter upwards are formed on the external periphery of the protruding engagement portion 12 at four equidistant positions in the circumferential direction, between each adjacent pair of upper half portions of the bolt head accommodation holes 15a. The length of each of the tapered engagement surfaces 18 in the circumferential direction is approximately ⅛ of the total circumference. Due to this, when an annular engagement portion 31 is elastically deformed as described later, it is possible to promote this elastic deformation, and thereby it is possible to enhance the close contact of the tapered engagement surfaces 18 and the annular engagement portion 31.

As shown in FIGS. 1, 2, and 4 through 6, the second reference member 20 comprises a flange portion 21 that is formed as a circular plate, a protruding engagement portion 22 that projects upwards from the central portion of the flange portion 21, a vertical bolt hole 23 formed in the central portion of the second reference member 20, and four vertical fitting bolts 24 for fixing the flange portion 21 to the base member 2 and four fitting bolt holes 25. The four fitting bolt holes 25 are arranged at equidistant positions around the circumferential direction.

The flange portion 21 is fixed, in the state in which the flange portion 21 of the second reference member 20 is held in a concave hole 26 formed in the base member 2, by passing each of the four fitting bolts 24 into a corresponding fitting bolt hole 25 and by screwing it into fitting bolt hole 27 formed in the base member 2. The upper surface of the flange portion 21 is formed as a horizontal plane that is lower than the reference seating surface 5 by a minute distance (refer to FIG. 4). As seen in plan view, a bolt head accommodation hole 25a of each of the fitting bolt holes 25 is formed so as partially to overlap with the protruding engagement portion 22. In other words, the bolt head accommodation hole 25a of each of the fitting bolt holes 25 is formed so as partially to encroach into the external circumferential portion of the protruding engagement portion 22. And the bolt head of the fitting bolt 24 is contained in the lower half portion of the bolt head accommodation hole 25a. The bolt head accommodation hole 25a encroaches by approximately ⅓ of its diameter into the external peripheral portion of the protruding engagement portion 22. The thickness of the wall portion between the bolt head accommodation hole 25a and the outer circumferential surface of the flange portion 21 is extremely small. Due to this, it is possible to reduce the diameter of the flange portion 21 and, to make the second reference member 20 more compact, so that it is possible to reduce the manufacturing cost.

Two tapered engagement surfaces 28 that reduce in diameter upwards are formed on the external periphery of the protruding engagement portion 22 at two equidistant positions in the circumferential direction, between adjacent pairs of upper half portions of the bolt head accommodation holes 25a. As seen in plan view, the two tapered engagement surfaces 28 face one another along a direction that is orthogonal to the center line L connecting the axes of the first and second reference members 10 and 20 (refer to FIG. 2). The lengths of the tapered engagement surfaces 28 in the circumferential direction are approximately ⅛ of the total circumference. Due to this, when an annular engagement portion 41 is elastically deformed as described later, it is possible to promote this elastic deformation, and thereby it is possible to enhance the close contact of the tapered engagement surfaces 28 and the annular engagement portion 41. Planar portions 28a are formed on the two outer surface portions of the protruding engagement portion 22 between the two tapered engagement surfaces 28, and it is arranged for the annular engagement portion 41 not to contact with these planar portions 28a.

Figure 3:
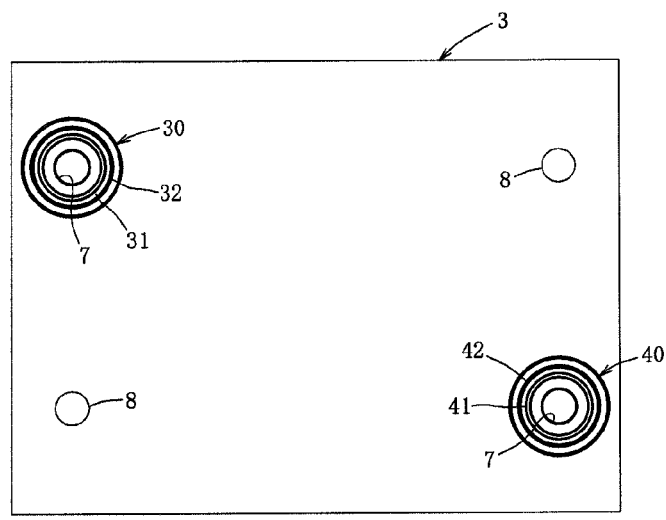
FIG. 3 is a bottom view of a work pallet.
Figure 7:
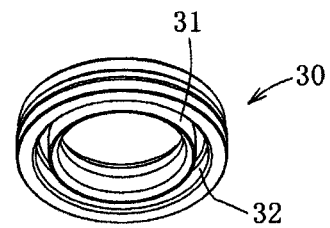
FIG. 7 is a perspective view of a first annular engagement member.

As shown in FIGS. 1, 3, and 7, the work pallet 3 comprises a first annular engagement member 30 that engages with the first reference member 10, a second annular engagement member 40 that engages with the second reference member 20, two clamp bolt passing holes 7 that correspond to the bolt holes 13, 23 in the first and second reference members 10, 20, and two clamp bolt passing holes 8 that correspond to the two bolt holes 6. The first annular engagement member 30 and the second annular engagement member 40 have the same structure.

Figure 4:
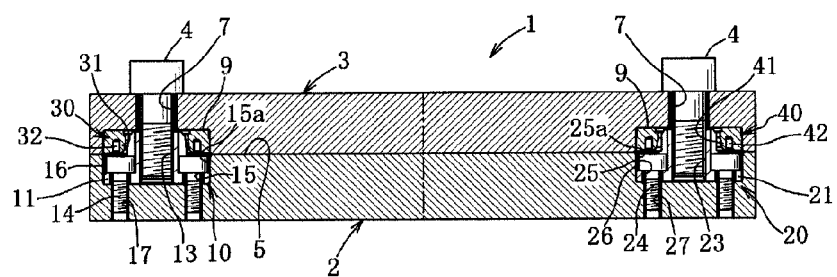
FIG. 4 is a sectional view along IV-IV line of FIG. 2.
Figure 5:
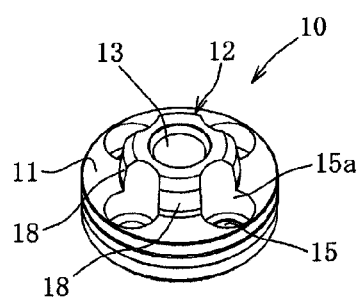
FIG. 5 is a perspective view of a first reference member.
Figure 6:
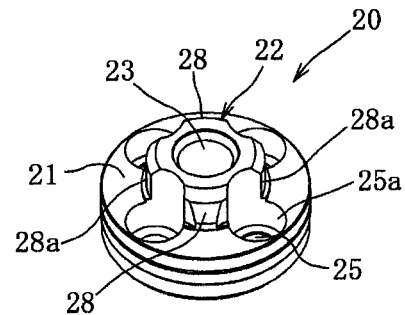
FIG. 6 is a perspective view of a second reference member.

As shown in FIGS. 3, 4, and 7, the first annular engagement member 30 is provided with an annular engagement portion 31 that, when fitted over the four tapered engagement surfaces 18 of the first reference member 10, is capable of elastic deformation in the direction to increase its external diameter, and that is capable of engaging with the four tapered engagement surfaces 18 of the first reference member 10 in a closely contacted state with each of them.

Figure 8:
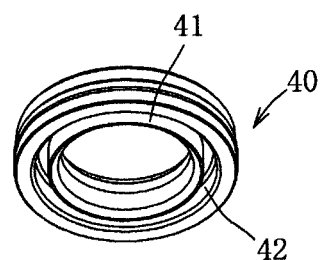
FIG. 8 is a perspective view of a second annular engagement member.
Figure 9:
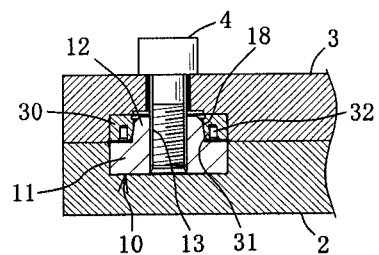
FIG. 9 is a sectional view of the first reference member, the first annular engagement member, etc.

And, as shown in FIGS. 3, 4, and 8, the second annular engagement member 40 is provided with an annular engagement portion 41 that, when fitted over the two tapered engagement surfaces 28 of the second reference member 20, is capable of elastic deformation in the direction to increase its external diameter, and that is capable of engaging with the two tapered engagement surfaces 28 of the second reference member 20 in a closely contacted state with each of them.

The first and second annular engagement members 30, 40 are fixed to the work pallet 3 by pressing into concave fitting holes 9 that are opening to the lower surface of the work pallet. The lower surfaces of the first and second annular engagement members 30, 40 are formed as horizontal planes that are higher than the lower surface of the work pallet 3 by a minute distance.

In the first and second annular engagement members 30, 40, annular grooves 32, 42 opening downwards are formed so as to enclose outer circumferential surfaces of the annular engagement portions 31, 41, and the annular engagement portions 31, 41 are formed to be annular wall portions having suitable thickness for imparting moderate rigidity in the horizontal direction, while being capable of elastic deformation in the direction to increase their external diameters, due to the annular grooves 32, 42.

It should be understood that the annular grooves 32, 42 are not necessarily limited to these structures; it would also be acceptable to provide annular grooves opening downwards between the first and second annular engagement members 30, 40 and wall portions of the work pallet 3. In this case, the annular engagement portions 31, 41 would be made with annular wall portions having suitable thickness for imparting moderate rigidity in the horizontal direction, while being capable of elastic deformation in the direction to increase their external diameters, due to those annular grooves.

The work pallet 3 is positioned and fixed by mounting the work pallet 3 on the reference seating surface 5 of the base member 2, by passing clamp bolts 4 through the clamp bolt passing holes 7 and screwing into the respective bolt holes 13, 23 of the first and second reference members 10, 20 and thereby pressing the work pallet 3 towards the reference seating surface 5, and by closely contacting the annular engagement portions 31, 41 to the tapered engagement surfaces 18, 28 via elastic deformation of the annular engagement portions 31, 41. It should be understood that also, as supplement, the portions of the work pallet 3 that are near the corner portions of the base member 2 that are distant from the first and second reference members 10, 20 are also fixed to the base member 2 by also passing clamp bolts 4 through the clamp bolt passing holes 8 are screwed into the bolt holes 6 of the base member 2, thereby pressing the work pallet 3 towards the reference seating surface 5.

Next, the operation and the advantages of this positioning and fixing device 1 described above will be explained.

The base member 2 is set in advance on the table of the machine tool, and is fixed there. In a workpiece preparation stage, in the state in which one or a plurality of workpieces are attached to the work pallet 3, the work pallet 3 is brought above the base member 2, and is mounted on the reference seating surface 5 of the upper surface of the base member 2.

At this time, the annular engagement portions 31, 41 of the annular engagement members 30, 40 on the side of the work pallet 3 are loosely engaged over the protruding engagement portions 12, 22 of the first and second reference members 10, 20. In this state, by passing two of the clamp bolts 4 through the clamp bolt passing holes 7 and screwing them into the bolt holes 13, 23 of the protruding engagement portions 12, 22 of the first and second reference members 10, 20, the annular engagement portions 31, 41 are elastically deformed in the direction to increase their external diameters, and are engaged and fixed in the closely contacted state to the plurality of tapered engagement surfaces 18, 28. Next, by passing the other two clamp bolts 4 through the clamp bolt passing holes 8 and by screwing them into the clamp bolt holes 6 of the base member 2, the portions of the work pallet 3 near that pair of corner portions are fixed to the base member 2. The lower surface of the work pallet 3 is contacted closely to the reference seating surface 5, thereby the work pallet 3 is positioned the vertical direction.

The annular engagement portion 31 of the annular engagement member 30 of the work pallet 3 is positioned in the horizontal direction by the first reference member 10, and the annular engagement portion 41 of the annular engagement member 40 is restricted by the pair of tapered engagement surfaces 28 so that it does not rotate in the horizontal plane around the axis of the first reference member 10 as a center. In this manner, it is possible for the work pallet 3 to be positioned in the horizontal direction and in the vertical direction with respect to the base member 2, and to be fixed thereto.

Moreover even if, due to manufacturing errors on the side of the work pallet 3 with respect to the base member 2, the distance between the axes of the annular engagement members 30, 40 and the distance between the axes of the first and second reference members 10, 20 are not equal, it is still possible to position and fix the work pallet 3, because a certain positional deviation of the annular engagement member 40 is permitted in the direction of the center line L, due to the pair of planar portions 28a.

Since, with this work pallet positioning and fixing device 1, a construction is adopted in which the four clamp bolts 4 are screwed into the bolt holes 13, 23, 6, 6, and the work pallet 3 is fixed by their clamping force, accordingly it is possible to reduce remarkably the manufacturing cost, because it is not necessary to provide any hydraulic cylinder or the like for clamping.

Since the entire area of the upper surface of the base member 2 is formed as the reference seating surface 5, accordingly there is no ingress of cutting chips or the like, because there is no gap between the upper surface of the base member 2 and the lower surface of the work pallet 3. And, since the reference seating surface 5 on which the lower surface of the work pallet 3 is seated is formed on the upper surface of the base member 2, accordingly it is possible to take advantage of the base member 2 for forming the reference seating surface 5.

Since the four tapered engagement surfaces 18 of the protruding engagement portion 12 of the first reference member 10 are divided into sections by the upper half portions of the bolt head accommodation holes 15a and are relatively short in the circumferential direction, and since the lengths of the tapered engagement surfaces 18 in the circumferential direction are approximately ⅛ of the circumference, accordingly the contacting pressure when the annular engagement portion 31 engages with the four tapered engagement surfaces 18 in the closely contacted state becomes high clue to elastic deformation of the annular engagement portion 31. For this reason, and since it is possible to promote the elastic deformation of the annular engagement portion 31, accordingly it is possible to deform the annular engagement portion 31 elastically and to closely contact it, even though the clamping force of the clamp bolts 4 is comparatively weak. Accordingly, the close contact of the four tapered engagement surfaces 18 and the annular engagement portion 31 is enhanced, so that it is possible to ensure the positioning accuracy in the horizontal direction. It should be understood that this fact is the same for the two tapered engagement surfaces 28 and the annular engagement portion 41 as well.

Moreover, since the four bolt head accommodation holes 15a are effectively utilized so that the four tapered engagement surfaces 18 are divided into sections, accordingly there is an advantage from the manufacturing aspect, because it is not necessary to form any special grooves for dividing the four tapered engagement surfaces 18 into sections.

Furthermore since, in the first and second reference members 10, 20, the plurality of fitting bolt holes 15, 25 that are formed in the flange portions 11, 21 are disposed as much as possible towards the centers (i.e. towards the protruding engagement portions 12, 22), accordingly it is possible to make the flange portions 11, 21 small in diameter, and to make the flange portions 11, 21 more compact, it is possible to make the first and second reference members 10, 20 more compact, and to reduce their manufacturing cost.

Since the flange portions 11, 21 of the first and second reference members 10, 20 are held in the concave holes 16, 26 formed in the base member 2 and are fixed therein, and since the annular engagement members 30, 40 are pressed into by forcible depression and fixed in the concave fitting holes 9 formed in the work pallet 3, accordingly it is possible to make the upper surface of the base member 2 planar, and to make the lower surface of the work pallet 3 planar.

Since the two vertically oriented bolt holes 6 are formed in the base member 2, and the two clamp bolt passing holes 8 corresponding to the two bolt holes 6 are formed in the work pallet 3, accordingly, by passing clamp bolts 8 through these bolt passing holes 8 and screwing them into the bolt holes 6, it is possible to increase the number of spots of the work pallet 3 that are fixed down.

Moreover, the bolt holes 13, 23 are formed in the central portions of the first and second reference members 10, 20, the plurality of bolt passing holes 7 are formed in portions of the work pallet 3 that correspond to the bolt holes 13, 23, the work pallet 3 is mounted on the reference seating surface 5 of the base member 2, and the plurality of clamp bolts 4 are engaged from the bolt passing holes 7 into the respective bolt holes 13, 23 of the first and second reference members. Accordingly, when engaging together the first and second reference members 10, 20 and the annular engagement members 30, 40, it is possible to engage tightly the plurality of tapered engagement surfaces 18, 28 to the annular engagement portions 31, 41 with strong force, since it is possible directly to engage the clamp bolts 4 to the first and second reference members 10, 20.

Embodiment 2

Figure 10:
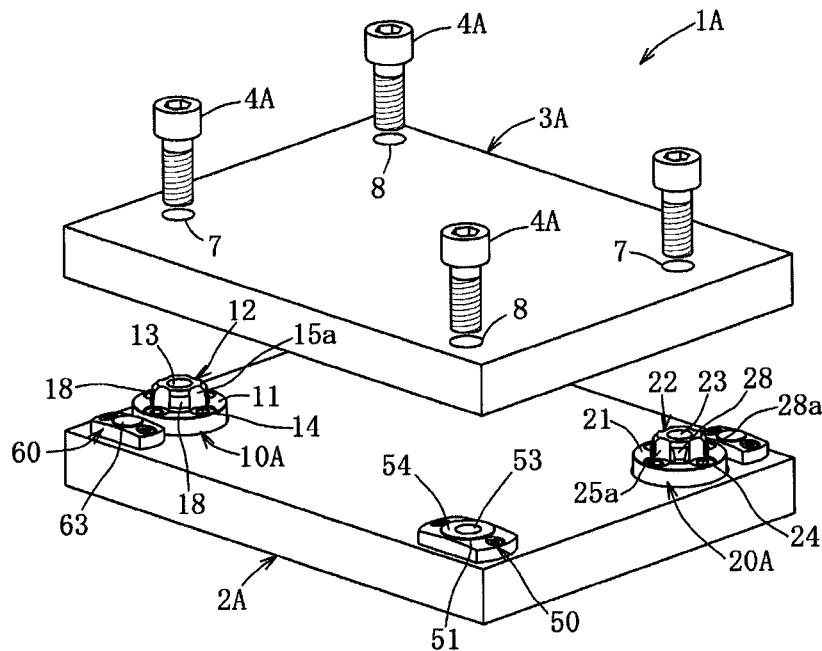
FIG. 10 is an exploded perspective view of a work pallet positioning and fixing device according to a second embodiment.
Figure 11:
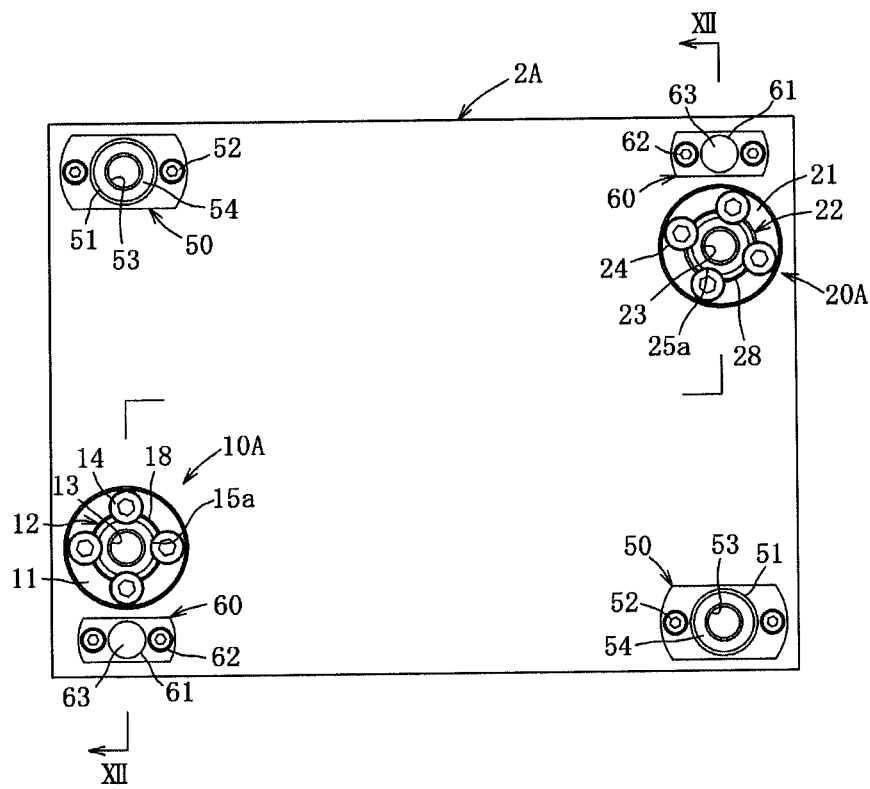
FIG. 11 is a plan view of a base member.
Figure 12:
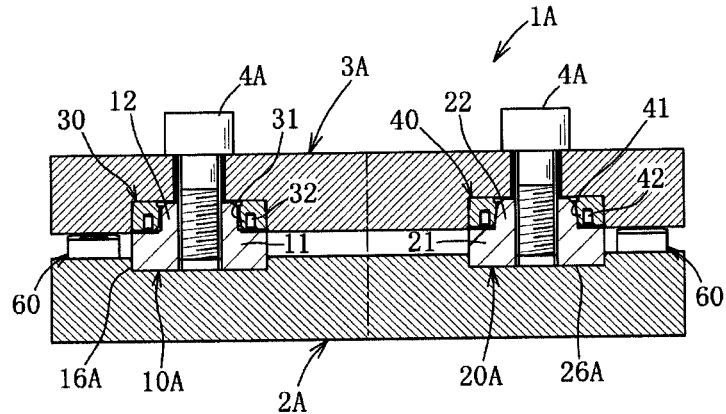
FIG. 12 is a sectional view of the work pallet positioning and fixing device along XII-XII line of FIG. 11.

Next, a work pallet positioning and fixing device 1A (hereinafter termed a "positioning and fixing device") according to a second embodiment will be explained on the basis of FIGS. 10 through 12. However, explanation of elements that are similar to ones of the device of the first embodiment will be omitted, and only structures that are different will be explained:

This positioning and fixing device 1A comprises a base member 2A, a work pallet 3A, four clamp bolts 4A, two bolt hole forming members 50 that are attached to the base member 2A, and two seating surface forming members 60.

The base member 2A comprises first and second reference members 10A, 20A. Only the lower portions of the first and second reference members 10A, 20A are fitted into the fitting holes 16A, 26A of the base member 2A, so that they are fitted in the state in which their portions other than their lower end portions project upwards higher than the upper surface of the base member 2A. Each of the first and second reference members 10A, 20A is similar to the first and second reference members 10, described above, and the work pallet 3A is similar to the work pallet 3 described above, while the clamp bolts 4A are also similar to the clamp bolts 4 described above.

The bolt hole forming members 50 are members for forming reference seating surfaces 54, and for forming bolt holes 53. The pair of bolt hole forming members 50 are arranged at a pair of the corner portions of the base member 2A that are in a mutually diagonal relationship. The bolt hole forming members 50 are formed in almost elliptical shapes with protruding seating portions 51 projecting at the central portions of the bolt hole forming members 50, and the bolt hole forming members 50 are fixed to the upper surface of the base member 2A by bolts 52 passing through bolt passing holes at both of their end portions and being screwed into bolt holes in the base member 2A. Vertical bolt holes 53 into which clamp bolts 4A are to be screwed are formed at the central portions of the protruding seating portions 51, and the annular reference seating surfaces 54 are formed surrounding the bolt holes 53, at the upper end surfaces of the protruding seating portions 51. The bolt holes 53 are provided in positions that correspond to the bolt passing holes 8 of the work pallet 3A. The reference seating surfaces 54 are provided at positions that are higher by a minute distance than the upper surfaces of the flange portions 11, 21 of the first and second reference members 10A, 20A.

The seating surface forming members 60 are elements for forming reference seating surfaces 63. The pair of seating surface forming members 60 are arranged at a pair of the corner portions of the base member 2A that are in a mutually diagonal relationship (i.e. at a pair of corner portions that are different from the pair of corner portions discussed above). One of the seating surface forming members 60 is arranged at a position in the neighborhood of the first reference member 10A, and the other of the seating surface forming members 60 is arranged at a position in the neighborhood of the second reference member 20A.

The seating surface forming members 60 are formed in long and narrow almost rectangular shapes, with protruding seating portions 61 projecting at the central portions of the seating surface forming members 60, and the seating surface forming members 60 are fixed to the upper surface of the base member 2A by bolts 62 passing through bolt passing holes at both of their end portions and being screwed into bolt holes in the base member 2A. Circular reference surfaces 63 are formed on the upper end surfaces of the protruding seating portions 61, and are positioned at the same height as the reference seating surfaces 54.

The work pallet positioning and fixing device 1A described above has fundamentally the same operation and provides fundamentally the same advantages as the work pallet positioning and fixing device 1 of the first embodiment.

And moreover, since the reference seating surfaces 54, 63 are defined on the bolt hole forming members 50 and the seating surface forming members 60 that are fixed to the upper surface of the base member 2A, accordingly it is possible to reduce the manufacturing cost of the base member 2A, since it is not necessary to enhance the accuracy of planarity of the upper surface of the base member 2A. Furthermore, since the total area of the reference seating surfaces 54, 63 is small, accordingly the area that is to be cleaned by blowing air against the reference seating surfaces 54, 63 is small, so that the blowing of air becomes simple and easy.

Embodiment 3

Next, a work pallet positioning and fixing device 1B (hereinafter termed a "positioning and fixing device") according to a third embodiment will be explained on the basis of FIGS. 13, 14. However, explanation of elements that are similar to ones of the device of the first embodiment will be omitted, and only structures that are different will be explained.

This positioning and fixing device 1B comprises a base member 2B, a work pallet 3B, and two clamp bolts 4B. Each of the base member 2B and the work pallet 3B is made as a long, narrow, and thick flat rectangular plate member. The entire area of the upper surface of the base member 2B is formed as a horizontal reference seating surface 5B on which the work pallet 3B is disposed, for seating the lower surface of the work pallet 3B and positioning it in the vertical direction. It should be understood that the base member 2B and the work pallet 3B could also be shaped as rectangular members as in the first embodiment, or as thick square flat plate members.

Figure 13:
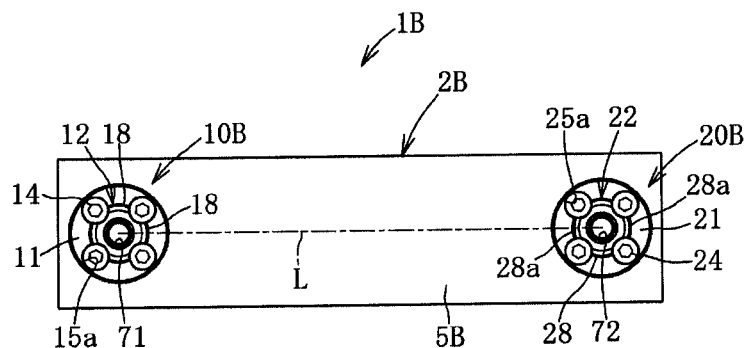
FIG. 13 is a plan view of a base member of a third embodiment.
Figure 14:
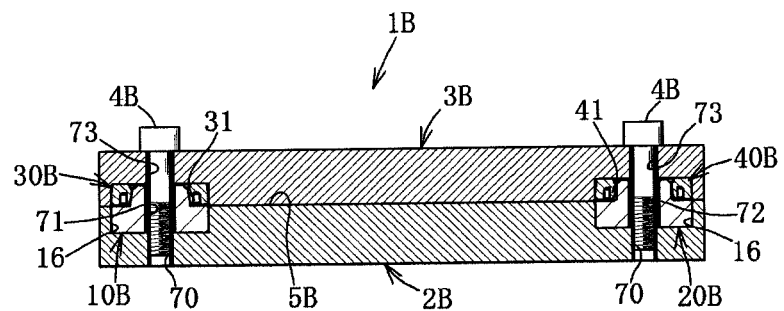
FIG. 14 is a sectional view of a work pallet positioning and fixing device.

As shown in FIGS. 13, 14, the base member 2B comprises a first reference member 10B for positioning in the horizontal direction, a second reference member 20B disposed at a position distant from the first reference member 10B and for restricting rotation in the horizontal plane around the first reference member 10B as a center, the reference seating surface 5B, and a pair of bolt holes 70. The pair of bolt holes 70 are formed in portions of the base member 2B corresponding to first bolt passing holes 71, 72 in the first and second reference members 10B, 20B, as will be described hereinafter. It should be understood that, if the base member 2B is shaped as a rectangle as in the first embodiment, or if it is shaped as a square, then the first and second reference members 10B, 20B are disposed at areas in the neighborhood of a pair of corner portions of the base member 2B that are in a mutually diagonal relationship, and a pair of bolt holes are disposed at areas in the neighborhood of the pair of corner portions that are different from that pair of corner portions.

Since the first reference member 10B has a structure similar to that of the first reference member 10 of the first embodiment, apart from the fact that the vertical first bolt passing hole 71 is formed in the central portion of the first reference member 10B instead of the bolt hole 13 of the first embodiment, accordingly explanation of its other structural features will be omitted. One of the vertical bolt holes 70 is formed in the central portion of a fitting hole 16 in which a flange portion 11 of the first reference member 10B is received.

Since the second reference member 20B has a structure similar to that of the second reference member 20 of the first embodiment, apart from the fact that the vertical first bolt passing hole 72 is formed in the central portion of the second reference member 20B instead of the bolt hole 23 of the first embodiment, accordingly explanation of its other structural features will be omitted. One of the vertical bolt holes 70 is formed in the central portion of a fitting hole 26 in which a flange portion 21 of the second reference member 20B is received. As seen in plan view, the two tapered engagement surfaces 28 face one another in a direction that is orthogonal to the center line L that connects the axes of the first and second reference members 10B, 20B (refer to FIG. 13).

The work pallet 3B comprises a first annular engagement member 30B that engages to the first reference member 10B, a second annular engagement member 40B that engages to the second reference member 20B, and two bolt passing holes 73 that correspond to the bolt passing holes 71, 72 in the first and second reference members 10B, 20B. It should be understood that the first annular engagement member 30B and the second annular engagement member 40B have the same structure. If the work pallet 3B is shaped as a rectangle as in the first embodiment, or if it is shaped as a square, then a pair of bolt passing holes are provided separately from the bolt passing holes 73, so as to correspond to a pair of bolt holes that are provided in a pair of corner portions of the base member.

The work pallet 3B is positioned and fixed by mounting the work pallet 3B on the reference seating surface 5B of the base member 2B, by engaging clamp bolts 4B through the bolt passing holes 73 and via the first bolt passing holes 71, 72 into the bolt holes 70 of the base member 2B, by thus pressing the work pallet 3B towards the reference seating surface 5B, and by closely engaging the annular engagement portions 31, 41 to the tapered engagement surfaces 18, 28 via elastic deformation of the annular engagement portions 31, 41.

When the annular engagement portions 31, 41 are closely engaged to the tapered engagement surfaces 18, 28, if the distance between the axes of the annular engagement members 30B, 40B and the distance between the axes of the first and second reference members 10B, 20B are not equal to one another, then, while it is possible to permit a slight positional deviation of the work pallet 3B with respect to the base member 2B in the direction of the center line L of the annular engagement member 40B via a gap between the annular engagement portion 41 and the pair of planar portions 28a, it is not possible for shifting in the vertical direction in FIG. 13 to take place via the pair of tapered engagement surfaces 28. Due to this, even if there is some error in the distance between the axes of the first and second reference members 10B, 20B of the base member 2B and the distance between the axes of the first and second annular engagement members 30B, 40B of the work pallet 3B, it is still possible to position and fix the work pallet 3B with respect to the base member 2B via the first and second reference members 10B, 20B.

The work pallet positioning and fixing device 1B described above has fundamentally the same operation and provides fundamentally the same advantages as the work pallet positioning and fixing device 1 of the first embodiment.

Moreover, the vertical first bolt passing holes 71, 72 are formed in the central portions of the first and second reference members 10B, 20B respectively, the plurality of bolt holes 70 are formed in the base member 2B to correspond to the first bolt passing holes 71, 72, the plurality of bolt passing holes 73 are formed in parts of the work pallet 3B that correspond to the first bolt passing holes 71, 72, the work pallet 3B is mounted on the reference seating surface 3B of the base member 2B, and the plurality of clamp bolts 4B are engaged into the bolt holes 70 of the base member 2B from the bolt passing holes 73 via the first bolt passing holes 71, 72 of the first and second reference members 10B, 20B. Accordingly, since the work pallet 3B is positioned and fixed to the base member 2B by the clamp bolts 4B passing through the first and second reference members 10B, 20B and being directly engaged to the base member 2B, it becomes possible to fix the first and second reference members 10B, 20B to the base member 2B with the minimum fixing force, so that it is possible to reduce the number of the plurality of fitting bolts 14, 24, or to reduce the size of the fitting bolts and to make the flange portions smaller in diameter, so that it is possible to reduce the manufacturing cost.

Embodiment 4

Next, a work pallet positioning and fixing device 1C (hereinafter termed a "positioning and fixing device") according to a fourth embodiment will be explained on the basis of FIGS. 15, 16. However, explanation of elements that are similar to ones of the device of the first embodiment will be omitted, and only structures that are different will be explained.

This positioning and fixing device 1C comprises a base member 2C, a work pallet 3C, and two clamp bolts 4C. Each of the base member 2C and the work pallet 3C is made as a long, narrow, and thick flat rectangular plate member. The entire area of the upper surface of the base member 2C is formed as a horizontal reference seating surface 5C on which the work pallet 3C is disposed, for seating the lower surface of the work pallet 3C and positioning it in the vertical direction. It should be understood that the base member 2C and the work pallet 3C could also be shaped as rectangular members as in the first and second embodiments, or as thick square flat plate members.

Figure 15:
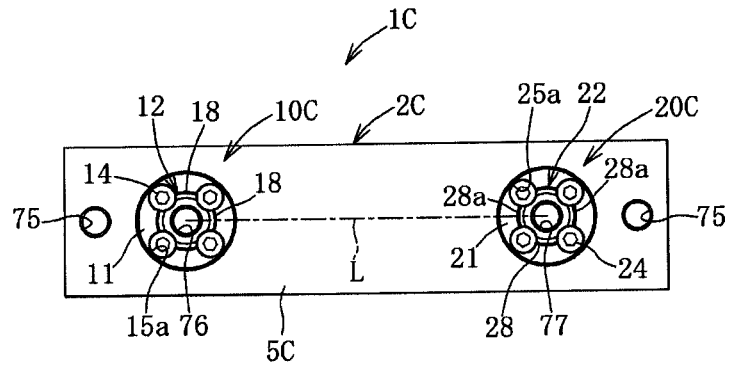
FIG. 15 is a plan view of a base member of a fourth embodiment.
Figure 16:
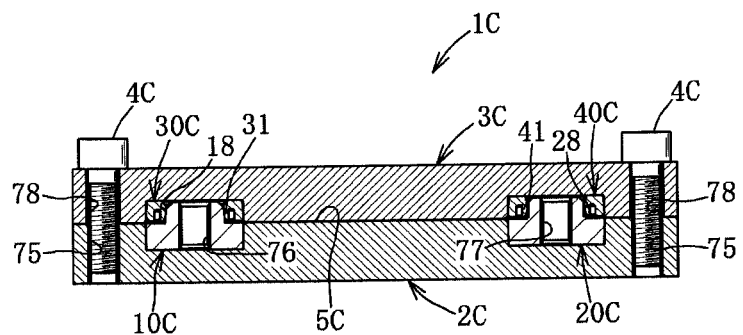
FIG. 16 is a sectional view of a work pallet positioning and fixing device.

As shown in FIGS. 15, 16, the base member 2C comprises a first reference member 10C for positioning in the horizontal direction, a second reference member 20C disposed at a position distant from the first reference member 10C and for restricting rotation in the horizontal plane around the first reference member 10C as a center, the reference seating surface 5C, and a pair of bolt holes 75. The first and second reference members 10C, 20C are disposed at locations in the neighborhood of the two end portions of the base member 2C. The pair of bolt holes 75 are formed at the outsides of the first and second reference members 10C, 20C at both end portions of the base member 2C. It should be understood that, if the base member 2C is shaped as a rectangle as in the first embodiment, or if it is shaped as a square, then the first and second reference members 10C, 20C and the pair of bolt holes 75 are disposed at areas in the neighborhood of a pair of corner portions of the base member 2C that are in a mutually diagonal relationship, and a pair of bolt holes are disposed at areas in the neighborhood of the pair of corner portions that are different from that pair of corner portions.

Since the first reference member 10C has a structure similar to that of the first reference member 10 of the first embodiment, apart from the fact that a vertical passing hole 76 is formed in the central portion of the first reference member 10C instead of the bolt hole 13 of the first embodiment, accordingly explanation of its other structural features will be omitted.

And, since the second reference member 20C has a structure similar to that of the second reference member 20 of the first embodiment, apart from the fact that a vertical hole 77 is formed in the central portion of the second reference member 20C instead of the bolt hole 23 of the first embodiment, accordingly explanation of its other structural features will be omitted.

The work pallet 3C comprises a first annular engagement member 30C that engages to the first reference member 10C, a second annular engagement member 40C that engages to the second reference member 20C, and two bolt passing holes 78 that correspond to the bolt holes 75 in the base member 2C. It should be understood that the first annular engagement member 30C and the second annular engagement member 40C have the same structure. If the work pallet 3C is shaped as a rectangle as in the first embodiment, or if it is shaped as a square, then a pair of bolt passing holes are provided separately from the bolt passing holes 78, so as to correspond to the pair of bolt holes that are provided in the pair of corner portions of the base member 2C.

The work pallet 3C is positioned and fixed by mounting the work pallet 3C on the reference seating surface 5C of the base member 2C, by engaging clamp bolts 4C through the bolt passing holes 78 into the bolt holes 75 of the base member 2C and by thus pressing the work pallet 3C towards the reference seating surface 5C, and by closely engaging the annular engagement portions 31, 41 to the tapered engagement surfaces 18, 28 via elastic deformation of the annular engagement portions 31, 41.

When the annular engagement portions 31, 41 are closely engaged to the tapered engagement surfaces 18, 28, if the distance between the axes of the annular engagement members 30C, 40C and the distance between the axes of the first and second reference members 10C, 20C are not equal to one another, then, while it is possible to permit a slight positional deviation of the work pallet 3C with respect to the base member 2C in the direction of the center line L of the annular engagement member 40C via a gap between the annular engagement portion 41 and the pair of planar portions 28a, it is not possible for shifting in the vertical direction in FIG. 15 to take place via the pair of tapered engagement surfaces 28. Due to this, even if there is some error in the distance between the axes of the first and second reference members 10C, 20C of the base member 2C and the distance between the axes of the first and second annular engagement members 30C, 40C of the work pallet 3C, it is still possible to position and fix the work pallet 3C with respect to the base member 2C via the first and second reference members 10C, 20C.

The work pallet positioning and fixing device 10 described above has fundamentally the same operation and provides fundamentally the same advantages as the work pallet positioning and fixing device 1 of the first embodiment.

Moreover, since the pair of bolt holes 75 are formed in portions of the base member 2C outside the first and second reference members 10C, 20C, and since the pair of bolt passing holes 78 are formed in portions of the work pallet 3C that correspond to this pair of bolt holes 75, accordingly it is possible to fix a larger sized workpiece to the work pallet, since it is possible to ensure space in which the workpiece can be installed on the upper surface of the work pallet 3C, corresponding to being above the first and second reference members 10C, 20C.

Embodiment 5

Next, a method of pressing the first and second annular engagement members 30, 40 into the concave fitting holes 9 of the work pallet 3, and of removing them, will be explained on the basis of FIGS. 17 through 19. However, explanation of elements that are similar to ones of the device of the first embodiment will be omitted, and only structures that are different will be explained.

First, a press means 80 for the first and second annular engagement members 30, 40 will be explained.

Figure 17:
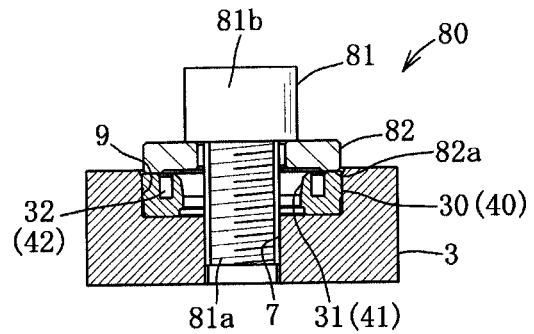
FIG. 17 is a sectional view of a work pallet according to a fifth embodiment.

As shown in FIG. 17, the press means 80 consists of a bolt member 81 and a ring member 82 that has approximately the same diameter as the first annular engagement member 30.

In order to press in and fix the first annular engagement member 30 to the concave fitting hole 9, first, the lower end hole of the annular engagement member 30 (i.e. the portion thereof at the opposite end from the annular groove 32) is inserted into the concave fitting hole 9. The lower end portion of the annular engagement member 30 is made to be slightly smaller in diameter, as compared to the end portion where the annular groove 32 is located. Next, an annular projecting portion 82a of the ring member 82 is contacted against the upper end external peripheral portion of the annular engagement member 30 (i.e. the end portion where the annular groove 32 is located), in a state in which it is matched to the axis of the annular engagement member 30. And, when a screw shaft portion 81a of the bolt member 81 is passed into the ring member 82 and the annular engagement member 30 and is screwed into the bolt passing hole 7, then the external peripheral lower end portion of the head 81b of the bolt member 81 presses via the ring member 82 against the annular engagement member 30 in the concave fitting hole 9, so that the annular engagement member 30 is pressed into and fixed in the concave fitting hole 9.

Since it is possible to press the annular engagement member 30 into the concave fitting hole 9 and to fix it there with the use of the bolt member 81 and the ring member 82 in this manner, accordingly it is possible to fit the annular engagement member 30 to the work pallet 3 in a simple and easy manner with a small number of components. It should be understood that it is also possible to press in and fit the second annular engagement member 40 to its concave fitting hole 9 by the same method.

Next, a first removal means 83 for the first and second annular engagement members 30, 40 will be explained.

Figure 18:
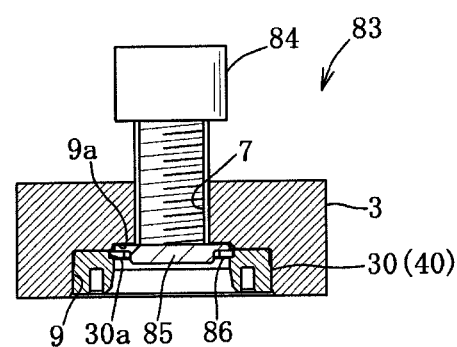
FIG. 18 is a sectional view of a work pallet.

As shown in FIG. 18, the first removal means 83 comprises a bolt member 84, a plate member 85 whose diameter is slightly smaller than the internal diameter of the annular engagement member 30, and a C ring 86 having rectangular cross section.

In order to remove the first annular engagement member 30 from the concave fitting hole 9, first, the plate member 85 is inserted from below into the small diameter concave portion 9a of the concave fitting hole 9, and is contacted against the upper end outer peripheral portion thereof. Next, in its compressed state (i.e. in its state in which it is of smaller diameter than the internal diameter of the annular engagement member 30), the C ring 86 is contacted against the lower end outer peripheral portion of the plate member 85. And next, this C ring 86 is allowed to increase in diameter so that it engages with the annular concave portion 30a of the annular engagement member 30, and thereby it is made impossible for the plate member 85 to shift relatively to the annular engagement member 30. And the bolt member 84 is screwed from above into the bolt passing hole 7, and, due to the plate member 85 being pressed by the end portion thereof, the annular engagement member 30 is pulled downwards and is removed from the concave fitting hole 9.

Since the first annular engagement member 30 is pulled out by the bolt member 84 via the plate member 85 and the C ring 86 in this manner, accordingly, even though the first annular engagement member 30 is pressed in and fixed in the concave fitting hole 9 with a strong force, still it is possible to remove it from the concave fitting hole 9 simply and easily. Moreover, it is possible to take the annular engagement member simply and easily off from the small components consisting of the bolt member 84, the plate member 85, and the C ring 86. It should be understood that it is also possible to remove the second annular engagement member 40 from its concave fitting hole 9 by an identical method.

Next, a second removal means 87 for the first and second annular engagement members 30, 40 will be explained.

Figure 19:
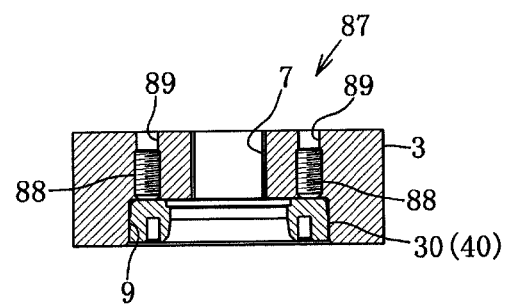
FIG. 19 is a sectional view of a work pallet.

As shown in FIG. 19, the second removal means 87 comprises a plurality of small diameter bolts 88 that have hexagonal holes into which a tool can be engaged, and a plurality of small diameter bolt holes 89 into which this plurality of small diameter bolts 88 can be screwed.

In order to remove the first annular engagement member 30 from the concave fitting hole 9, by screwing one of the small diameter bolts 88 into each of the plurality of small diameter bolt holes 89, and by pressing the annular engagement member 30 downwards with the end portions of these plurality of small diameter bolts 88, it is removed from the concave fitting hole 9. It should be understood that the small diameter bolts 88 could be screwed into the small diameter bolt holes 89 during removal of the annular engagement member 30, or could be already in the state of being installed in the small diameter bolt holes 89.

Thus, even if the first annular engagement member 30 is pressed into and fixed in the concave fitting hole 9 with a strong force, it can still be simply and easily removed with the plurality of small diameter bolts 88. Moreover, it is possible to remove the annular engagement member 30 that is pressed in and fixed in a simple and easy manner, even with the compact components comprising of the plurality of small diameter bolts 88. It should be understood that it is also possible to remove the second annular engagement member 40 from its concave fitting hole 9 by an identical method.

Next, examples in which the above embodiments are partially varied will be explained.

[1] In the above first through fourth embodiments, it would also be acceptable to adopt constructions in which the head of the clamp bolts 4, 4A through 4C are each contained in a hollowed out portion formed in the work pallets 3, 3A through 3C.

[2] In the above described first and second embodiments, it would also be possible to apply various other structures for the work pallets 3, 3A; for example, the work pallet may include a similar flat plate member to that of the work pallet 3 or 3A as shown in the figures, with a square tube member mounted on this flat plate member, and with a workpiece being fixed to the side surface of this square tube member.

[3] The number of the bolts 14, 24 that attach the flange portions 11, 21 of the first and second reference members 10, 20 in the first embodiment described above is not limited to being four; it could be three, or five or more. It should be understood that the same is true for the first reference members 10A through 10C and for the second reference members 20A through 20C of the second through the fourth embodiments.

[4] Apart from the above, for a person skilled in the art, it would be possible to implement various changes in the above embodiments in additional ways, without deviating from the gist of the present invention.

Description of Numerals
1, 1A~1C: work pallet positioning and fixing device
2, 2A~2C: base member
3, 3A~3C: work pallet
4, 4A~4C: clamp bolts
5, 5B, 5C: reference seating surface
6: bolt hole
7, 8: bolt passing hole
10, 10A~10C: first reference member
20, 20A~20C: second reference member
11, 21: flange portion
12, 22: protruding engagement portion
13, 23: bolt hole
14, 24: fitting bolt
15, 25: bolt hole
15a, 25a: bolt head accommodation hole
18, 28: tapered engagement surface
30, 40: annular engagement member
31, 41: annular engagement portion
50: bolt hole forming member
60: seating surface forming member
54, 63: reference seating surface
70, 71, 72, 75: bolt hole

The invention claimed is:

1. A work pallet positioning and fixing device that positions and fixes a work pallet above a base member in the horizontal direction and in the vertical direction; wherein
said base member comprises a first reference member for positioning in the horizontal direction, a second reference member disposed at a position distant from the first reference member and for restricting rotation in a horizontal plane around the first reference member as a center, and a reference seating surface for positioning in the vertical direction;
each of said first and second reference members comprises a flange portion, a protruding engagement portion that projects upwards from a central portion of the flange portion, and a plurality of vertical fitting bolts and a plurality of fitting bolt holes that fix the flange portion to the base member;
a bolt head accommodation hole of each of said fitting bolt holes being formed in a state of partially overlapping with said protruding engagement portion as seen in plan view, and a plurality of tapered engagement surfaces that reduce in diameter upwards are formed on an outer periphery of the protruding engagement portion between the bolt head accommodation holes;
said work pallet comprises a plurality of annular engagement members, comprising respectively annular engagement portions capable of being deformed elastically in the direction to increase their external diameter, and capable of engaging with the plurality of tapered engagement surfaces of the first and the second reference members in a closely engaged state; and
there is provided with a constitution that by mounting the work pallet on the reference seating surface of said base member, and by screwing a plurality of clamp bolts passed through a plurality of bolt passing holes formed in said work pallet into a plurality of bolt holes on the side of said base member and thereby pressing the work pallet to said reference seating surface, the work pallet is positioned and fixed via elastic deformation of said annular engagement portions.

2. A work pallet positioning and fixing device according to claim 1; wherein
said plurality of clamp bolt holes are formed in central portions of said first and second reference members;
said plurality of bolt passing holes are formed, in portions of the work pallet that correspond to said clamp bolt holes; and
in a state where the work pallet is mounted on the reference seating surface of said base member, the plurality of clamp bolts are passed through the bolt passing holes and are screwed into the clamp bolt holes of the first and second reference members.

3. A work pallet positioning and fixing device according to claim 1; wherein
a pair of first vertical bolt passing holes are formed in central portions of said first and second reference members respectively;
said plurality of bolt holes are formed in portions of said base member that correspond to said first bolt passing holes;
said plurality of bolt passing holes are formed in portions of said work pallet that correspond to said first bolt passing holes; and
the work pallet is mounted on the reference seating surface of said base member, and the plurality of clamp bolts are passed respectively through the bolt passing holes and the first bolt passing holes of the first and second reference members, and are screwed into the bolt holes of the base member respectively.

4. A work pallet positioning and fixing device according to claim 1; wherein
said second reference member has a pair of tapered engagement surfaces that, as seen in plan view, oppose one another in a direction orthogonal to a center line that joins axes of the first and second reference members.

5. A work pallet positioning and fixing device according to claim 1; wherein, on an upper surface of said base member, said reference seating surface is formed on which a lower surface of the work pallet is seated.

6. A work pallet positioning and fixing device according to any one of claim 1 through 5; wherein each of flange portions of said first and second reference members is received in a concave hole formed in the base member and is fixed by a plurality of fitting bolts, and each of said annular engagement members is pressed into and fixed in concave fitting hole that is opening to a lower surface of the work pallet.

* * * * *